JAY J. WIGGIN, OF SYRACUSE, NEW YORK.

*Letters Patent No. 83,576, dated October 27, 1868.*

IMPROVED ROOFING-COMPOSITION FOR HOUSES, BOATS, BARNS, &c.

The Schedule referred to in these Letters Patent and making part of the same.

*To all whom it may concern:*

Be it known that I, JAY J. WIGGIN, of Syracuse, in the county of Onondaga, in the State of New York, have invented a new and improved Composition for the Roofing of Houses, Boats, Cars, &c.; and I do hereby declare that the following is a full and exact description thereof.

The object of my invention is to provide a covering for the tops of houses, boats, cars, &c., which shall be cheap, durable, indestructible by fire, and impervious to water, and this object is secured by my composition, which I call my "Egyptian Granite Roofing."

To enable others skilled in the art to make and use the same, I will proceed to describe how and of what ingredients my composition is made.

I mix together one measure or part of sand, two parts of clay, and one part of air-slaked lime, the slaking of the lime being completed only when it is put into the composition. Eight bushels of this mixture and one barrel of coal-tar, or gas-tar, are then added together, and boiled for six hours, after which I add one more gallon of gas-tar, which will give the composition the elasticity requisite for expansions and contractions caused by heat and cold, and then it is ready for running into sheets, and being rolled into rolls.

Claim.

What I claim as my invention, and desire to secure by Letters Patent, is—

The compound made of the ingredients before described, in the proportions above set forth, substantially as and for the purpose described.

JAY J. WIGGIN.

Witnesses:
 EDM. F. BROWN,
 A. M. STOUT.